United States Patent [19]

Dickinson et al.

[11] Patent Number: 5,602,585
[45] Date of Patent: Feb. 11, 1997

[54] METHOD AND SYSTEM FOR CAMERA WITH MOTION DETECTION

[75] Inventors: Alexander G. Dickinson, Neptune; Jack E. Salata, Metuchen, both of N.J.

[73] Assignee: Lucent Technologies Inc., Murray Hill, N.J.

[21] Appl. No.: 363,456

[22] Filed: Dec. 22, 1994

[51] Int. Cl.$^6$ .................................................. H04N 7/18
[52] U.S. Cl. .............................................. 348/155; 348/152
[58] Field of Search ........................... 348/143, 151–155; 340/527, 554, 825.3, 825.31, 825.32; 377/60; H04N 7/18

[56] References Cited

U.S. PATENT DOCUMENTS

| | | | |
|---|---|---|---|
| 3,900,841 | 8/1975 | Buckles | 340/527 |
| 3,932,703 | 1/1976 | Bolsey | 348/155 |
| 3,967,283 | 6/1976 | Clark et al. | 340/554 |
| 3,988,533 | 10/1976 | Mick et al. | 348/155 |
| 4,081,830 | 3/1978 | Mick et al. | 348/155 |
| 4,337,481 | 6/1982 | Mick et al. | 348/154 |
| 4,408,224 | 10/1983 | Yoshida | 348/155 |
| 4,857,912 | 8/1989 | Everett, Jr. et al. | 340/825.3 |
| 5,339,104 | 8/1994 | Hong | 348/155 |
| 5,471,515 | 11/1995 | Fossum et al. | 377/60 |

OTHER PUBLICATIONS

Fossum, E. R., "Active Pixel Sensors: Are CCD's Dinosaurs?," Proceedings of the SPIE, vol. 1900, Charge–Coupled Devices and Solid State Optical Sensors III, Feb. 2–3, 1993, San Jose, California, pp. 2–14.

Fossum, E. R., "Assessment of Image Sensor Technology for Future Nasa Missions," Proceedings of the SPIE, vol. 2172, Charge–Coupled Devices and Solid State Optical Sensors IV, pp. 1–16.

Mendis, S., et al., "CMOS Active Pixel Image Sensor," IEEE Transactions on Electron Devices, vol. 41, No. 3, Mar. 1994, pp. 452–453.

*Primary Examiner*—Howard W. Britton
*Assistant Examiner*—Richard Lee

[57] ABSTRACT

A motion detection camera system which may be used as a security camera includes an active pixel imaging system operable in a video and differential mode connected to a mode activation circuit that controls the imaging system mode. In the video mode, the imaging system generates an output signal containing information of a viewed area on a frame by frame manner. In the differential mode, the imaging system generates a differential output signal containing information consisting of the differences in the viewed area between adjacent detected frames. Normally, the imaging system camera is operated in the differential mode. If no motion occurs in the viewed area, the corresponding differential output signal representing the interframe differences will have a constant signal level. Upon detecting that the differential output signal deviates by greater than a threshold level indicating motion in the viewed area, the mode activation circuit causes the imaging system to operate in its video mode. The corresponding generated video output signal of the imaging system is then provided to monitoring equipment, such as a video cassette recorder for recording of the motion in the viewed area.

11 Claims, 4 Drawing Sheets

METHOD AND SYSTEM FOR CAMERA WITH MOTION DETECTION

FIELD OF THE INVENTION

This invention relates generally to improvements in video security cameras, and more specifically to an active pixel sensor based camera capable of motion detection.

BACKGROUND OF THE INVENTION

Security camera systems often monitor areas where individuals are not normally present for substantial periods of time, such as display cases containing store merchandise during non-business hours or activities within bank vaults. Typically, such security camera systems employ video recording equipment to record images of the viewed area. Since no or little motion occurs within these viewed areas over long periods of time it is desirable to record images of the viewed area only when motion occurs. Such motion may be caused by individuals, whether lawfully or illegally, entering the viewed area.

Some prior art security cameras have employed external motion detectors, such as infra-red or microwave motion detector devices, to activate the recording equipment associated with the cameras when motion is detected in the viewed area. A drawback to such systems is there high cost and bulk. Typically, the relative large size of the camera and motion detector arrangement of the system are unsightly and difficult to hide.

A smaller prior art motion detection arrangement employs a video camera, an analog-to-digital converter, a frame buffer and a system controller to detect motion by sensing interframe differences in the video signal generated by the video camera. In this arrangement, the video signal generated by the camera is digitized by the analog-to-digital converter. The digitized signal for each video frame is temporally buffered in the frame buffer where the controller compares it with the respective next generated frame information to detect if motion has occurred between the frames. When motion is detected, the video signal is provided to a recording device. Although this arrangement eliminates the need for a separate motion detector, it is complex and costly.

Therefore, a need exists for a low cost, compact security camera system with built-in motion detection.

SUMMARY OF THE INVENTION

In one embodiment of the present invention, a system for a camera with motion detection comprises an active pixel imaging system operable in a differential or video mode, and a mode activation circuit. A mode select output of the activation circuit is connected to a mode select input of the imaging system and a signal input of the activation circuit is connected to an imaging system output. The imaging system operates in the differential or video mode based on the signal at its mode select input. When in the video mode, the imaging system generates a video signal containing information for each detected image frame of a viewed image, and when in the differential mode, the imaging system generates a differential signal containing information of interframe differences. An imaging system capable of operating in such modes may employ active pixel sensors that buffer signals corresponding to a previous frame's detected light intensity during the detection of a present frame's light intensity.

In operation, the mode activation circuit causes the imaging system to operate in its differential mode by producing a signal in a first logic level at the mode select output. If no motion occurs in the viewed area, the corresponding differential output signal representing the interframe differences is at a constant signal level. Upon sensing that the corresponding generated differential output signal level changes from the constant level by greater than a threshold value indicating motion in the viewed area, the mode activation circuit causes the imaging system to operate in its video mode by generating a signal at the mode select output in a second logic level. The mode activation circuit provides the corresponding video signal generated by the imaging system to the mode activation circuit output where it may be used by associated monitoring equipment.

One suitable mode activation circuit includes a switch, a threshold detector and a mode selector. The switch has an input for receipt of the imaging system output signal, a first output that provides any generated video signals to a monitoring device such as video recording equipment and a second output that provides the generated differential output signal to the threshold detector. The threshold detector monitors the differential output signal to determine if the signal level exceeds the threshold level. If the differential output signal exceeds the threshold level, the threshold detector provides a corresponding signal to the mode selector which controls the imaging system mode and the position of the switch.

The present invention may be used as a low cost, compact security camera that may be implemented on a single chip and that as a result may be small and easy to hide. A region of interest for motion detection may be precisely defined by setting the field of view of the camera system, such as with a conventional lens. Furthermore, the field of view and correspondingly, the motion detection region may be adjusted by simply adjusting the lens or changing to a different lens.

Additional features and advantages of the present invention, will become apparent by reference to the following derailed description and accompanying drawings.

DETAILED DESCRIPTION

Figure 1:
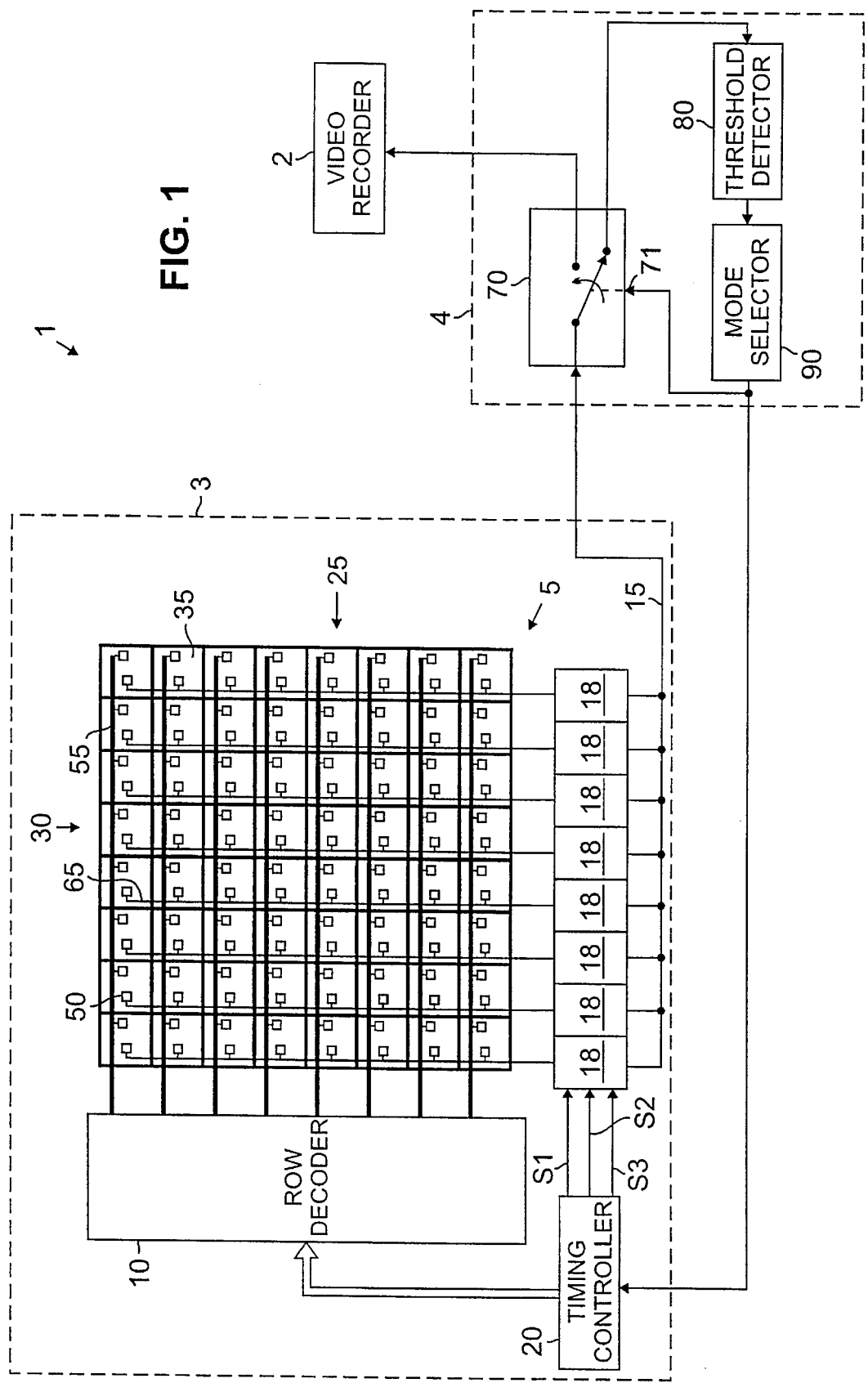
FIG. 1 is a schematic diagram of an exemplary camera system in accordance with the present invention.

FIG. 1 shows an exemplary camera system 1 according to the present invention connected to a monitoring device such as a video recorder 2. The camera system 1 includes an active pixel sensor camera 3 capable of operating in a differential or video mode connected to a mode activation circuit 4. The camera system 1 is shown connected to the video recorder 2 for ease of illustration purposes only. An alternative suitable monitoring device includes an alarm, alone or in combination with the video recorder 2, to alert security personnel or police of the detected motion in the viewed area. Also, a television monitor may be used with or without an alarm to permit security personnel to monitor the area from a remote security station when motion is detected.

A presently preferred active pixel sensor imaging system which may suitably be used as the active pixel sensor camera 3 is illustrated within the block outline of the camera 3 and described in detail in U.S. patent application Ser. No. 08/323,203, entitled "ACTIVE PIXEL SENSOR AND IMAGING SYSTEM HAVING DIFFERENTIAL MODE," filed Oct. 14, 1994, which is assigned to the assignee of the present invention and incorporated by reference herein. The active pixel sensor imaging system of the camera 3 includes an array of active pixel sensors 5, a row decoder 10, a plurality of output circuits 18 and a timing controller 20. The active pixel sensor array 5 consists of eight rows 25 and eight columns 30 of closely spaced active pixel sensors 35. The active pixel sensor array 5 is shown as a eight-by-eight sensor array for illustrative purposes only and is not meant to be a limitation on the present invention. An active pixel sensor array which may be used in the camera system 1 may consist of any number of row and columns of active pixel sensors, and should preferably consist of a sufficiently large number of pixels to obtain the desired resolution of video information in the output signal.

Figure 2:
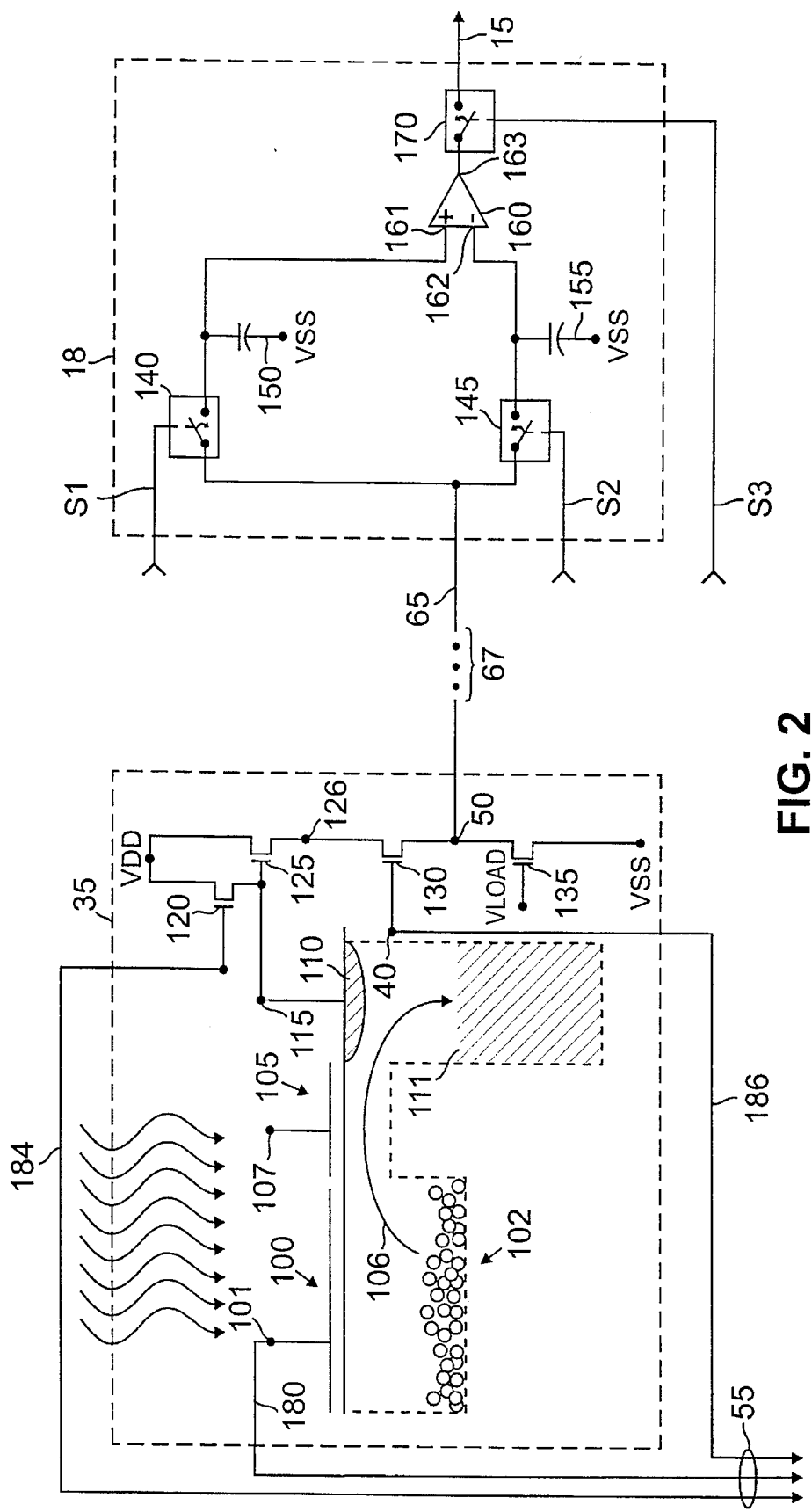
FIG. 2 is a schematic diagram of an exemplary active pixel sensor and output circuit which may be used in an imaging system of the camera system of FIG. 1.

Each active pixel sensor 35 is capable of converting a detected quantity of light to a corresponding electrical signal at an output 50. A plurality of control lines 55 extend from the row decoder 10 and connect to each sensor 35 in a respective sensor row 25. The control lines 55 connected to each sensor 35 consist of a photogate control line 80, a reset control line 184 and a select control line 186, as shown in FIG. 2. Each sensor output 50 in the corresponding sensor column 30 is connected by a column output line 65 to a particular output circuit 18. Each output circuit 18 is further connected to a common imaging system output line 15.

The common output line 15 is connected to the mode activation circuit 3. An exemplary mode activation circuit 4 is illustrated in FIG. 1 and includes a switch 70, a threshold detector 80 and a mode selector 90. The common imaging system output line 15 of the imaging system 3 is connected to the switch 70. The switch 70 is further connected to the video recorder 2 and the threshold detector 80. The switch 70 is operable in first and second positions to connect the common output line 15 to the threshold detector 70 or video recorder 2, respectively. The threshold detector 80 is also connected to the mode selector 90. The mode selector 90 is further connected to the timing controller 20 within the imaging system 3 and a control input 71 of the switch 70.

In operation, whether in the differential or video modes, the timing controller 20 of the imaging system 3 provides timing signals to the row decoder 10 which sequentially activates each row 25 of active pixel sensors 35 via the control lines 55 to detect light intensity and to generate corresponding output voltage signals during each frame interval. A frame, as used herein, refers to a single complete cycle of activating and sensing the output from each sensor 35 in the array 5 a single time over a predetermined frame time period. The timing of the imaging system 3 is controlled to achieve a desired frame rate, such as 30 flames per second.

When detecting a particular image frame of the viewed area, each sensor row 25 may be activated to detect light intensity over a substantial duration of the frame interval. In the time remaining after the sensor row 25 has detected the light intensity for the frame, each of the respective sensors 35 within the row 25 simultaneously generates output voltage signals corresponding to the mount of light detected by that sensor 35. If an image is focused on the sensor array 5 by, for example, a conventional camera lens, then each pixel sensor 35 generates an output voltage signal corresponding to the light intensity for a portion of the image of the viewed area focused on that sensor 35. The output voltage signals generated by the activated sensor row 25 are simultaneously provided to the respective output circuits 18 via the column output line 65.

The output circuits 18 generate either difference or video output signals based on the corresponding received sensor output signals and the operating mode of the imaging system 3. The generated output signals are provided to the output line 15 in a serial fashion to form a differential or video output signal for the corresponding image frame based on timing control signals from the timing controller 20. The timing controller 20 controls the row decoder 10 and plurality of output circuits 18 to continuously generate an output signal for consecutive frames at the predetermined frame rate.

When operating in the video mode, the video output signal comprises information for each detected image frame of the viewed area. When operating in the differential mode, the differential output signal comprises information corresponding to the difference between adjacent detected image frames of the viewed area. If there is no motion or change in the viewed area that is detected by the imaging system 3, then no interframe differences exist and the differential output signal is generated at a constant level, such as at zero volts. If, however, a change appears due to motion in the viewed image between consecutive frame readouts, such as when a person enters the viewed area, then the imaging system 3 generates a corresponding differential output signal that is not constant.

The imaging system 3 is normally operated in the differential mode with the switch 70 in its first position such that the differential output signal on the common line 15 is supplied to the threshold detector 80. The threshold detector 80 generates a digital output signal at a first logic level when the differential output signal is below a threshold signal level and at a second logic level when the differential output signal is above the threshold signal level. The threshold signal level should be selected such that its signal level is greater than the signal level of the differential output signal representing the viewed area without motion, and less than the differential output signal when motion is detected. Accordingly, the threshold detector 80 generates an output signal at a first logic level when no motion is present in the viewed area.

The threshold detector digital output signal is provided to the mode selector 90. Based on the logic level of the threshold detector digital output signal, the mode selector provides a mode signal to the timing controller 20 to cause the imaging system to operate in the differential or video mode. When the threshold detector digital output signal is at a first logic level indicating that no motion is detected, the mode selector 90 generates the mode signal to maintain the imaging system operation in the differential mode. The mode signal generated by the mode selector 90 is also provided to the switch control input 71. When the imaging system 3 is operated in the differential mode, the switch is maintained in its first position to provide the generated differential output signal to the threshold detector 80.

When the image in the viewed area changes, such as when a person enters the viewed area, the signal level of the corresponding generated differential output signal will exceed the threshold level causing the threshold detector 80 to generate the digital output signal at the second logic level. In response, the mode selector 90 generates the mode signal to cause the timing controller 20 to operate the imaging system 3 in the video mode and cause the switch 70 switch to its second position. As a consequence, the corresponding generated video output signal is provided to the video recorder 2. At a predetermined time duration later, the mode selector 90 generates the mode output signal to cause the imaging system 3 to revert back to its differential mode and the switch 70 to switch to its first position to confirm continued movement in the viewed area. In addition, the mode selector 90 may also be connected to the video recorder 2 or other monitoring equipment to alert such equipment that motion has been detected and that a video signal of such motion is being generated.

A suitable threshold detector 80 is a comparator with a positive input connected to the switch 70 and a negative input connected to a voltage source that generates a desired threshold voltage. An output of the comparator generates the digital output signal and is connected to the mode selector 90. The mode selector 90 may consist of a suitable combinational logic circuit, programmable logic array, finite state machine implementation such as application specific integrated circuits or any other circuit capable of generating the necessary logic signals. The mode selector 90 may employ a timer circuit or device to determine the time interval after which the imaging system 3 will revert back to the differential mode from the video mode to determine whether any further motion is detected.

Suitable timing controller circuits 20 for the imaging system 3 include microprocessor controllers, finite state machine implementations, such as application specific integrated circuits, combinational logic circuits or any other circuit capable of generating the necessary timing signals to the row decoder 10 and the plurality of output circuits 18. The row decoder 10 may be a counter, a demultiplexer or any circuit or device capable of individually activating each sensor row 25. Although the row decoder 10 is shown separate from the timing controller 20, a single device or circuit may be employed to perform the functions of these two components in accordance with the present invention.

Each active pixel sensor 35 in the array 5 may consist of a photosite and one or more on-chip transistors to provide both gain and buffering functions. Active pixel sensor, as used herein, refers to devices commonly known in the art as active pixel sensors, as well as any other device or sensor configuration which collects and stores electrical charge in proportion to detected light intensity, and which buffers such stored electrical charge. A general description of exemplary active pixel sensors 35 is provided in, for example, Fossum, E. R. "Active Pixel Sensors: Are CCD's Dinosaurs?", Proceeding of SPIE: Charge-Coupled Devices and Solid State Optical Sensors III, Vol. 1900, pp. 2–14 (1993), ("Fossum reference"), which is incorporated by reference herein.

An exemplary active pixel sensor 35 and a corresponding output circuit 18 in accordance with the present invention are shown in FIG. 2. Referring to FIG. 2, the sensor 35 is connected to the output circuit 18 by the corresponding column output line 65. Since other sensors 35 are also connected to the column output line 65, the line 65 has been shown broken by ellipses 67 for clarity. The other sensors 35 may preferably operate in a substantially identical manner to the sensor 35 shown in FIG. 2. Only one output circuit 18 has been shown in FIG. 2 for ease of illustration. The other output circuits 18, shown in FIG. 1, may preferably operate in a substantially identical manner to the circuit 18 illustrated in FIG. 2.

In FIG. 2, the active pixel sensor 35 may be represented as a photogate 100 charge-coupled to a transfer gate 105 which is further charge-coupled to a diffusion well 110. The gates 100 and 105 have gate electrodes 101 and 107, respectively. The photogate electrode 101 is connected to the photogate control line 180. The transfer gate electrode 107 may be connected to a suitable fixed voltage to enable the transfer of electrical charge from the photogate 100 to the diffusion well 110 as is described below. Electrons 102 beneath the photogate 100, electron transfer arrow 106, and transferred electrons 111 in the diffusion well 110 represent an electron well diagram that illustrates the transfer of electrical charge from the photogate 100, through the transfer gate 105, to the diffusion well 110.

The active pixel sensor 35 further includes a reset transistor 120, a voltage-follower transistor 125, a select transistor 130 and a load, such as a suitably biased load transistor 135. A diffusion node 115 connects the diffusion well 110 to the reset transistor 120 and the voltage-follower transistor 125. The reset and voltage-follower transistors 120, 125 are further connected to a fixed voltage VDD, which will preferably be five volts if the active pixel sensor 35 is implemented as a CMOS device. The reset transistor 120 is also connected to the reset control line 184 of the control lines 55 that extends from the row decoder 10 shown in FIG. 1. An output 126 of the voltage-follower transistor 125 is further connected to the select transistor 130 which is connected to the load transistor 135.

The load transistor 135 is also connected to a fixed load voltage VLOAD and a fixed voltage VSS. The fixed voltage VSS will preferably be zero volts if the active pixel sensor 35 is implemented as a CMOS device. The select transistor 130 is further connected to the select control line 186 of the control lines 55 shown in FIG. 1. The load voltage VLOAD should be adjusted such that a desired resistance value is achieved across the load transistor 135 between the column output line 65 and the fixed voltage VSS. The desired resistance value should enable the transistor 125 to operate in a voltage follower mode when the select transistor 130 operates in saturation to effectively act as a closed switch between the transistors 125 and 135. Suitable alternatives for the load transistor 135 include on-chip or surface mount resistors, or any other passive or active devices which can provide the required electrical resistance when disposed between the column output line 65 and the fixed voltage VSS.

The sensor output 50, shown in FIG. 1, is schematically represented in FIG. 2 by a like numbered connection node between the select transistor 130 and load transistor 135. The column output line 65 connects the sensor output 50 to the corresponding output circuit 18. Within the output circuit 18, the sensor output signal is provided to first and second switches 140, 145 which may be, for example, transistor switches or solid state relays. The switches 140, 145 may individually be operated in open or closed positions. In the closed positions, the switches 140, 145 provide a sensor output signal to corresponding first and second charge storage devices, such as capacitors 150 and 155. The capacitors 150 and 155 are connected to the fixed voltage VSS as well as respective inputs 161 and 162 of a subtractive signal combiner, such as a differential amplifier 160. The switches 140 and 145 are controlled by control signals S1 and S2 generated by the timing control circuit 20.

An output 163 of the differential amplifier 160 generates the sensor difference or video output signal which is provided to a third single-pole single-throw switch 170. The switch 170 is further connected to the imaging system output line 15. The switch 170 operates in an open or closed position, as controlled by a switch control signal S3 generated by the timing controller 20. When closed, the switch 170 provides the sensor difference or video output signal to the common output line 15.

In operation, whether in differential or video mode, the imaging system row decoder 10 generates a suitable photogate control signal on the photogate control line 180 to cause the photogates 100 of each sensor 35 in the corresponding row 25 to collect electrical charge based on detected light intensities. The photogate 100 is permitted to collect electrical charge over an integration period, which may be a substantial portion of the frame interval. For instance, if the frame interval is 33 msec., corresponding to 30 frames per second, the integration period may be 33 msec. less approximately one microsecond if the sensor 35 is implemented as a CMOS device.

Upon completion of the integration period, the row decoder 10 may cause the biased transfer gate 105 to transfer the collected charge from the photogate 100 to the diffusion well 110 by generating a suitable pulse in the photogate control signal. This method of transferring charge is well known in the art and is described in, for example, the above cited Fossum reference. A suitable duration of the photogate control signal pulse to cause the transfer of the collected electrical charge may be, for example, on the order of one microsecond. Further, the fixed transfer gate biasing voltage may be on the order of 2.5 volts if the sensor 35 is implemented as a CMOS device.

Another well known technique for transferring charge within an active pixel sensor is to clock or pulse the transfer gate electrode when the transfer is required. Both the biasing and clocking techniques cause the voltage potential beneath the transfer gates 105 to be greater than that beneath the photogate 100. Since electrical charge moves from regions of lower potential to regions of higher potential, the collected charge in the photogate 100 moves to the transfer gate 105 and then to the diffusion well 110.

In the sensor 35, the electrical charge maintained in the diffusion well 110 is buffered by the transistors 125 and 130 from signals generated over the corresponding column output line 65 by the other sensors 35 in the column 30. The transfer gate 105 further acts to buffer the electrical charge maintained in the diffusion well 110 from that collected by the photogate 100 at all times except when electrical charge is transferred from the photogate 100 to the diffusion well 110. Accordingly, in the differential mode, the imaging system 3 relies on the buffered diffusion nodes 110 to maintain an electrical charge for a previous frame's detected light intensity when the photogate 100 of the sensor 35 is collecting electrical charge for a present frame. As a consequence, the present invention may use only two charge storage devices 150, 155 and a subtractive signal combiner 160 per sensor column 30 to generate the differential output signal. Conversely, typical prior art cameras required a more complex arrangement of using an analog-to-digital converter and an external frame buffer memory to generate a differential output signal.

In both the differential and video modes, each sensor 35 operates in a light detection period corresponding to the integration period, and a read out period. For a given detected frame interval, each sensor row 25 is sequentially activated to detect light during a light detection period and then selected to generate corresponding output signals during the read out period. The light detection period and read out period may overlap during the respective differential and video modes as is described in detail below with regard to FIGS. 3 and 4. For example, if a frame interval of 33 msec. is desired, the light detection period may consist of a substantial portion of that interval, and the read out period may be on the order of 10 μsec. after the light detection period. The row decoder 10 may further cause the light detection periods for adjacent sensor rows 25 to overlap to achieve the desired frame rate during the read out period. Such an overlapping technique is well known in the imaging system art.

Figure 3:
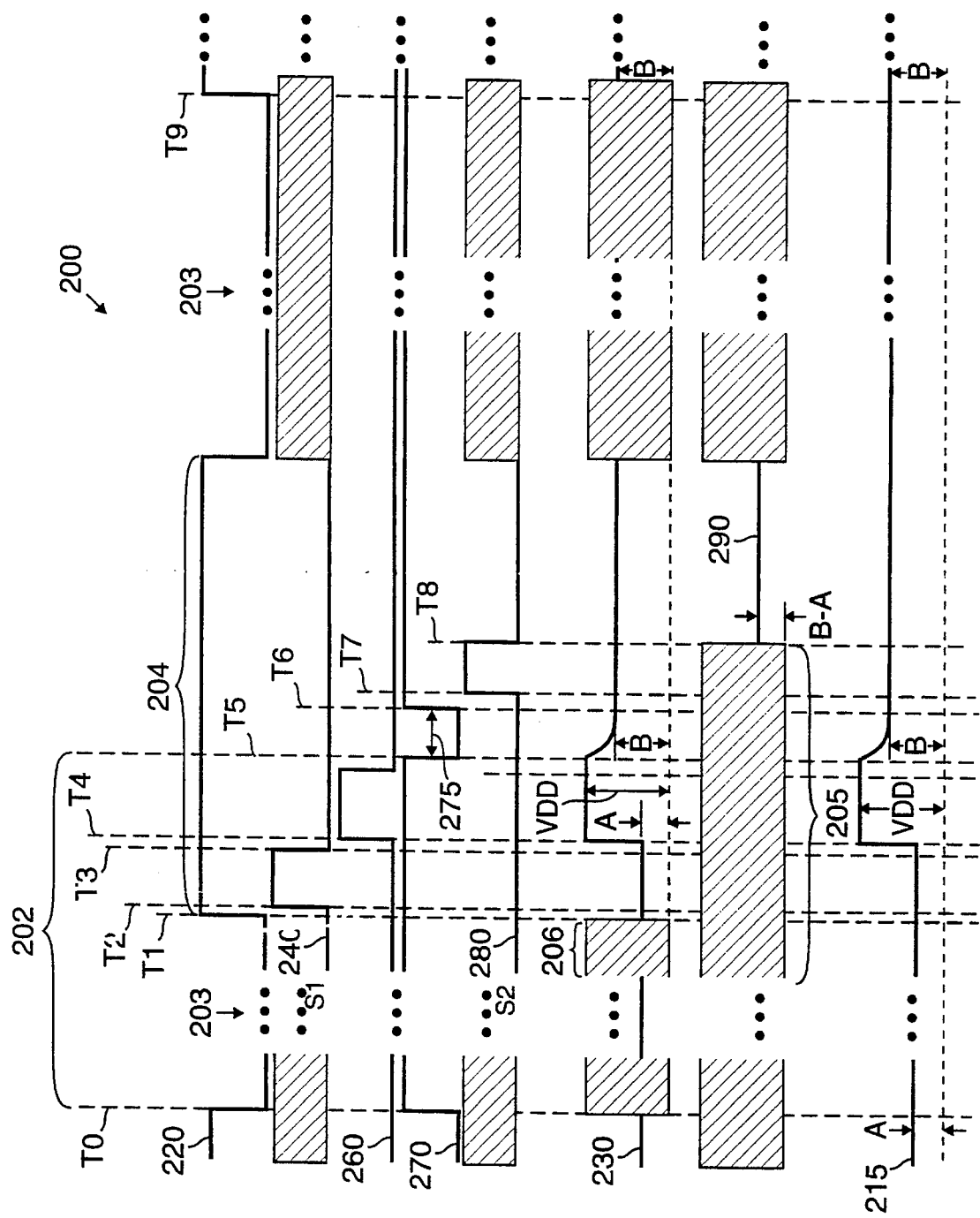
FIG. 3 is a timing diagram illustrating exemplary operation of the circuit of FIG. 2 for motion detection.

FIG. 3 shows a timing diagram of a suitable method of operation of the sensor 35 and output circuit 18 of FIG. 2 in the differential mode. In FIG. 3, details of waveforms 200 for an overlapping light detection period 202 and read out period 204 of the sensor 35 are shown for a present frame interval. Since the light integration period 202 is much longer than the read out period 204, the waveforms 200 have been shown by ellipses 203 during the light detection period for clarity. "Don't care" regions of the waveforms 200 are illustrated by cross-hatched bars, such as region 205 of the waveform 290.

During the light detection period 202 which occurs between times T0 and T5, the row decoder 10, shown in FIG. 1, provides the photogate control signal, illustrated by waveform 270, in a high voltage state to the photogate electrode 101. The photogate control signal in the high voltage state causes the sensor photogate 100 to collect electrical charge based on the light intensity focused on the sensor 35 for the present frame. The photogate control signal 270 in the high voltage state further prevents the transfer gate 105 from transferring collected electrical charge to the diffusion well 110 during the light detection period 202. As a consequence, the electrical charge maintained in the diffusion well 110 is buffered from the photogate 100 during the present frame's light detection period 202 and thus corresponds to the previous frame's detected light intensity. Since the voltage potential at the diffusion node 115, illustrated as waveform 215, corresponds to the electrical charge maintained by the diffusion well 110, it, likewise, corresponds to the previous frame's detected light intensity during the light detection period 202. The diffusion node voltage potential 215 is shown having a voltage magnitude A during the light detection period 202.

At a time substantially near the end of the light detection period 202, such as at time T1, the row decoder 10 initiates the read out period by generating the select control signal, illustrated as waveform 220, in a high voltage state. The select control signal 220 remains in a high voltage state for the duration of the read out period 204 and is in a low voltage state at all other times. The high voltage state select control signal 220 causes the select transistor 130, shown in FIG. 2, normally in an off state, to operate in saturation or in an on state.

When operated in the on state, the select transistor 130 acts effectively as a closed switch which enables the transistor 125 to operate as a voltage-follower. While the transistor 125 operates as a voltage follower it generates a voltage at its output 126 and a voltage signal at the sensor output 50 that corresponds to the voltage potential 215 at the diffusion node 115. Since the diffusion node voltage potential 215 has a voltage A at time T1, the output voltage signal 230 illustrated as waveform 230, is proportional to the voltage A at time T1 and also corresponds to the previous frame's detected light intensity. Prior to time T1, the select transistor is in the off state and no output voltage signal is generated, as indicated by the "don't care" region 206.

A short time after the select signal is generated, such as at time T2, the timing controller 20 generates a switch control signal S1 in a high voltage state, illustrated as waveform 240, which closes switch 140. When switch 140 is closed, the capacitor 150 charges to a voltage proportional to the sensor output voltage signal 230. After the capacitor 150 has had sufficient time to charge, such as at time T3, the switch control signal S1 240 is generated in a low voltage state causing the switch 140 to open. The time duration between times T2 and T3 should be selected to permit the capacitor 150 to sufficiently charge to the voltage potential of the received sensor output signal 230. In a presently preferred CMOS embodiment of the invention, a suitable charging time for the capacitor 150 is on the order of one microsecond. At time T3, the charge stored in the capacitor 150 is the voltage A or, in other words, the amount of detected light by the sensor 35 for the previous frame.

After the voltage A has been stored in the first capacitor 150, such as at time T4, the row decoder 10 generates the reset signal pulse on the reset control line 55 in a high voltage state, as shown by waveform 260. This reset signal pulse 260 causes the reset transistor 120 to operate in the on state which forces the diffusion node 115 to the voltage VDD. As a consequence, the corresponding sensor output signal 230, likewise, increases to a voltage proportional to the voltage VDD. Shortly after the reset pulse has concluded, such as at time T5, the light detection period 202 ends and a low voltage pulse 275 is generated for the photogate control signal 270. The low voltage pulse 275, between times T5 and T6, causes the electrical charge collected by the photogate 100 to transfer to the diffusion well 110 in a manner described above with regard to FIG. 2.

The transferred electrical charge causes the diffusion node voltage 215 and the corresponding output voltage signal 230 to lower in proportion to the amount of collected charge representing the detected light intensity for the present frame. The greater the light intensity, the greater the amount of collected charge and the lower the corresponding diffusion node voltage 215 potential. Shortly after time T5, the output voltage signal 230 provided to the output circuit 18 corresponds to the detected light intensity for the present frame which is shown as a voltage B.

After the electrical charge is transferred to the diffusion well 110, such as at time T7, the timing control device 20 closes the second switch 150 by generating the switch control signal S2 in a high voltage state, as shown by the waveform 280. The closed switch 145 causes the second capacitor 155 to charge to of the sensor output signal voltage which is the voltage B. At time T8, after the capacitor 155 had sufficient time to charge, the timing controller 20 opens the switch 145 by generating the signal S2 in a low voltage state.

After time T8, the voltages across the capacitors 150 and 155 correspond to the voltages A and B, respectively. As a consequence, after time T8, the differential amplifier generates a sensor difference output signal 290 that is a voltage corresponding to the difference between the voltages A and B. Prior to time T8, the waveform 290 consists of the "don't care" region 205. Since the voltages across the capacitors 150 and 155 represent the light intensity detected by the sensor 35 for the previous and present frames, the generated sensor difference signal represents the difference of the light intensity of the frames detected by the sensor 35.

At the appropriate time, the timing controller 20 generates switch control signal S3 to close the switch 170 which provides the sensor difference output signal to the imaging system output line 15. The switch 170 is only closed at a particular time and for the proper duration, in order to insert the sensor differential output signal into its proper sequence position within the imaging system differential output signal. Each pixel sensor 35 in each array row 25 is preferably operated in the same manner as is described above with regard to FIG. 3 to generate a differential output signal for a frame of a detected image. Since the voltage present at the diffusion node 115 of each sensor 35 is buffered from the corresponding photogate 100 and column output line 65, it maintains a voltage based on an amount of detected light from frame to frame. Accordingly, the voltage at the diffusion node 115 remains a voltage corresponding to the voltage B until that sensor 35 again enters a read out period for the next detected frame, as shown at time T9 in FIG. 3. During read out of the sensor 35 for the next frame at time T9, the voltage B of the sensor output signal 230 corresponds to the previous frame's detected light intensity.

In FIG. 3, the sensor output signal 230 for the two consecutive frames is shown having two different voltage potentials for clarity. Thus, FIG. 3 depicts the operation of the imaging system 3 when an interframe difference is detected representing motion occurring in the viewed area. If no motion occurs in the area viewed by the imaging system 3, the sensors' output signal would be equal for the two frames and the corresponding difference output signal would be a voltage level of zero.

Figure 4:
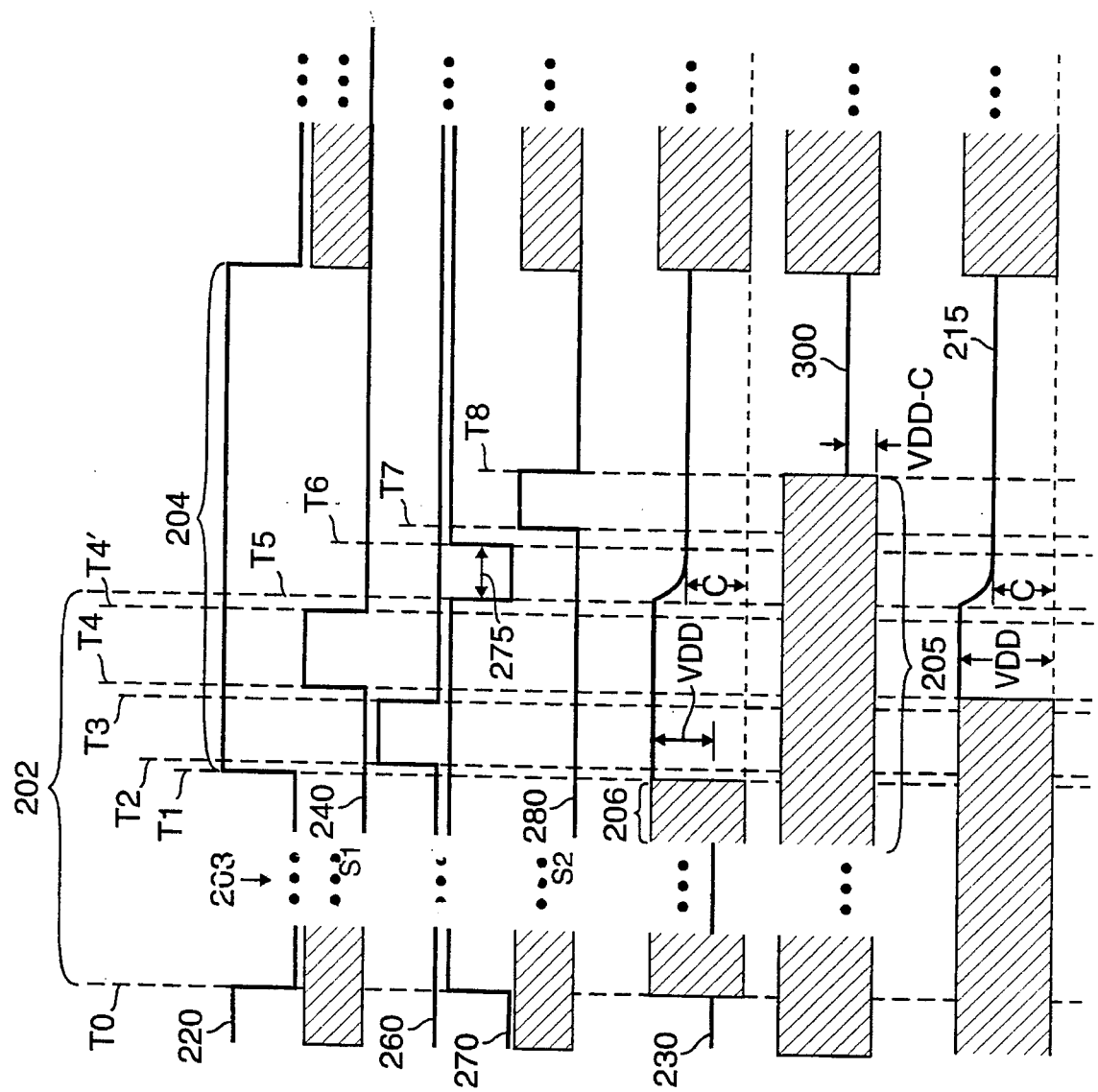
FIG. 4 is a timing diagram illustrating exemplary operation of the circuit of FIG. 2 for producing a video signal.

FIG. 4 shows a timing diagram illustrating a suitable method of operation of the sensor 35 and output circuit 18 of FIG. 2 in the video mode. In FIGS. 3 and 4, like waveform reference numbers and timing references are used for clarity, such as the select control signal 220, time T0 and the light detection phase 202. A video output signal waveform 300 is shown in FIG. 4 representing the generated signal by the output circuit 18.

The operation of the sensor 35 and corresponding output circuit 18 during the light detection period 202 in the video mode is substantially identical to that of the differential mode. Accordingly, the photogate enable signal 270 is generated at a high voltage level during the light detection period 202 between times T0 and T5. Also, the read detection period 204 starts at time T1 by the generation of the select control signal 220 in a high logic state which causes the transistor 125 to operate as a voltage follower and the sensor output signal 230 to appear at the sensor output 50 that represents the voltage 215 at the diffusion node 115.

At time T2, the reset signal pulse 260 is generated which causes the reset transistor 120 to operate in the on state and force the diffusion node 115 to the voltage VDD. As a consequence, the sensor output signal 230 increases to a voltage corresponding to the voltage VDD. A short time after the reset signal pulse 275 is generated, such as at time T3, the timing controller 20 generates the switch control signal S1 240 in a high voltage state closing switch 140 and causing the capacitor 150 to charge to the voltage VDD of the sensor output signal 230. After the capacitor 150 has sufficiently charged, such as at time T4', the switch 140 is again opened by generation of the control signal S1 240 in a low voltage state.

Shortly after the switch 140 is opened, such as at time T5, the light detection period 202 ends and a low voltage pulse 275 is generated as the photogate control signal 270. This low voltage pulse 275 causes the collected electrical charge in the photogate 100 to transfer to the diffusion well 110. The transferred charge causes the diffusion node voltage 215 and the corresponding output voltage signal 230 to lower in proportion to the amount of collected charge to a voltage C which represents the detected light intensity for the present frame. As a consequence, shortly after time T5, the output signal 230 having the voltage C is provided to the output circuit 18.

The voltage C of the sensor output signal 230 is then stored by the storage device 155 by closing the second switch 150. The second switch 150 is closed by causing the switch control signal S2 280 to assume a high logic state at time T7. Then, at time T8, after the capacitor 155 had sufficient time to charge, the timing controller 20 opens the switch 150 by generating the control signal S2 280 in a low voltage state. As a consequence, at time T8, voltages VDD and C are maintained across the capacitors 150 and 155, respectively. Accordingly, after time T8, the differential amplifier 160 generates a video output signal 300 having a voltage of VDD-C. The voltage VDD-C corresponds to the voltage drop that occurs at the diffusion node voltage 215, shown in FIG. 2, when the collected electrons representing the amount of detected light are transferred from the photogate 100 to the diffusion well 111. Thus, after time T8 of the read out period 204, the video signal 300 generated by the output circuit 18 represents the amount of detected light by that sensor for the present frame.

The timing controller 20 then generates the switch control signal S3 at the appropriate time to close the switch 170 to provide the sensor output signal to the imaging system output line 15 to insert it into its proper sequence position in the formation of the imaging system video output signal. Each pixel sensor 35 in each array row 25 is preferably operated in the same manner as is described above with regard to FIG. 4 to generate a video output signal for a frame of the detected image. As stated above, while the mode selector 90 shown in FIG. 1 is operating the imaging system 3 in the video mode, it is controlling the switch 70 to operate in its second position to provide the generated video signal to the video recorder 2. At a predetermined time interval later, such as five minutes, the mode selector 90 reverts the imaging system back to the differential mode and the switch 70 back to its first position to determine if motion is still occurring in the viewed area.

Advantages of a camera system according to the present invention include that the motion detection region may be precisely defined by setting the field of view of the camera system, such as with a conventional lens. Furthermore, the field of view and correspondingly, the motion detection region may be adjusted by simply adjusting the camera lens or changing to a different lens. Another advantage of the present invention is that the threshold detector 80 and mode selector 90 of FIG. 1 may consist of a single circuit, and that the camera system may be implemented on a single semiconductor chip.

Although one embodiment of an active pixel sensor camera system has been described in detail above, many modifications to the described embodiment are possible without departing from the teaching of the present invention. All such modifications are intended to be encompassed by the claimed invention. For instance, other configurations of the mode activation circuit 4 may be used by the present invention including a single circuit to perform the operations of the threshold detector 80 and the mode selector 90. In addition, suitable alternative uses for the camera system include baby and hospital patient monitoring and car alarms. Since active pixel sensors may detect infra-red light, a camera system according to the present invention may view a dark area of interest by illuminating the dark area with infra-red light and operate in a substantially identical manner as that described above.

Also, within the imaging system 3, the output circuit 18 may use one single-throw double-pole switch instead of the two switches 140, 145, or may consist of any configuration of components capable of providing two serially received voltage signals to a signal combiner in a parallel fashion, and generating a difference signal based on the two voltage signals. In addition, other active pixel sensor implementations with different voltages may be readily employed.

We claim:

1. A motion detection camera system comprising:

an active pixel imaging system having an output and a mode select input, the imaging system being operable in a differential or video mode based on the signal at the mode select input, wherein the imaging system generates a video signal containing information for each detected image frame of a viewed area when in the video mode and a differential signal containing information of interframe differences when in the differential mode, the imaging system further comprising:

(i) a plurality of active pixel sensors arranged in an array of rows and columns, each active pixel sensor being operable to generate a voltage at a diffusion node corresponding to detected light intensity by the sensor, each active pixel sensor being further operable to buffer the voltage potential present on the diffusion node from other signals generated external to the sensor;

(ii) means for sequentially activating sensors in different portions of the array for a period of time to achieve a desired detected frame interval;

(iii) a plurality of output circuits, each output circuit being connected to the respective sensors in a corresponding portion of the array, each output circuit being operable to store first and second voltage signals received from the connected sensors and to selectively provide a sensor output signal to the imaging system output; and (iv) a timing controller connected to the activating means and each differential output circuit, wherein the timing controller is operable to cause each sensor row to be sequentially activated, and when in a differential mode, to cause the activated sensors to provide a voltage signal corresponding to a previous detected frame to the output circuits and then to provide a voltage signal corresponding to a present detected frame to the output circuits, and when in a video mode, to cause the activated sensors to provide a voltage signal corresponding to a reference voltage to the output circuits and then to provide a voltage signal corresponding to a present detected frame to the output circuits, and wherein the timing controller is further operable to cause the output circuits to sequentially provide the output signals to a common output line to generate either of the imaging system output signals;

a switch having an input, first and second outputs and a control input, the input being connected to the imaging system output, the first output being operable to provide a video output signal to a monitoring device;

a threshold detector having an input and an output, the input being connected to the second switch output; and a mode selector having an input and an output, the input being connected to the detector output, the output being connected to the switch control input and the imaging system mode select input.

2. A method for a motion detection camera system employing an active pixel imaging system operable in a differential or video mode, wherein the imaging system has an array active pixel sensors, each sensor capable of collecting electrical charge based on a detected light intensity and having a diffusion well capable of holding an amount of electrical charge, each diffusion well being buffered from electrical signals generated external to the sensor, comprising the steps of:

operating the imaging system in the differential mode to generate an imaging system output signal as a differential signal containing information of the interframe difference of a viewed area, wherein operating in the differential mode comprises the steps of:

(i) sequentially activating sensors in different portions of the array for a period of time to achieve a desired detected frame interval;

(ii) detecting a first voltage potential at a diffusion node of each activated sensor, wherein each of the first voltage potentials correspond to collected charges held by the respective diffusion wells for the image of the viewed area at a corresponding immediate previous frame;

(iii) resetting the voltage potential of the respective diffusion nodes of the activated sensors to a reference voltage potential;

(iv) transferring electrical charges collected for a present frame's detected light intensity from the image by each activated sensor to corresponding diffusion wells within the respective sensors, the voltage potentials at the activated sensors' diffusion nodes changing from the predetermined voltage potential to second voltage potentials corresponding to the respective amounts of transferred electrical charges;

(v) detecting the second voltage potentials at the diffusion nodes of the activated sensors; and (vi) generating the differential output signal based on sequentially determining the difference between the detected first and second voltage potentials of the activated sensors, wherein the sequential activation of the sensors in each portion of the array generates an output signal of sequential segments of the detected differences in the image of the viewed area at the corresponding pixel sensors between the previous and present frames;

detecting whether the differential output signal has a signal level that deviates by greater than a threshold value, wherein a deviation in the differential output signal indicates motion within the viewed area;

operating the imaging system in the video mode upon detecting that the differential output signal level has deviated greater than the threshold value, wherein the imaging system generates the output signal as a video signal containing information for detected frame; and providing the video output signal to a monitoring device.

3. The method of claim 2, wherein the step of sequentially activating sensors in different portions of the array comprises activating the sensors in corresponding sensor rows.

4. The method of claim 2, wherein the step of generating the differential output signal further comprises determining the step of the difference between the detected first and second voltage potentials in the activated sensor row using respective differential output circuits connected to a respective active pixel sensor in each of the portions of the array.

5. The method of claim 2, further comprising the steps of:

storing the first voltage potential of said each activated sensor in a respective one of a first plurality of charge-storage devices; and storing the second voltage potential of said each activated sensor in a respective one of a second plurality of charge storage devices, wherein the step of generating the output signal includes applying the respective voltage potentials in each of the first and second pluralities of the charge storage devices to a plurality of subtractive signal combiners that sequentially generate the corresponding portions of the differential output signal.

6. The method of claim 2, wherein the step of operating the imaging system in the video mode comprises:

sequentially activating sensors in different portions of the array for a period of time to achieve a desired detected frame interval;

resetting the voltage potential of the respective diffusion nodes of the activated sensors to a reference voltage potential;

detecting a first voltage potential at a diffusion node of said each activated sensor, wherein each of the first voltage potentials correspond to the reference voltage potential;

transferring electrical charges collected for a present frame's detected light intensity from the image by said each activated sensor to corresponding diffusion wells within the respective sensors, the voltage potentials at the activated sensors' diffusion nodes changing from the reference voltage potential to second voltage potentials corresponding to the respective amounts of transferred electrical charges;

detecting the second voltage potentials at the diffusion nodes of the activated sensors; and generating the video output signal based on sequentially determining the difference between the detected first and second voltage potentials of the activated sensors, wherein the sequential activation of the sensors in each portion of the array generates an output signal of sequential segments of the image of the viewed area at the corresponding pixel sensors.

7. A motion detection camera system operable in a differential or video mode based on a signal at the mode select input, wherein the imaging system generates a video signal containing information for each detected image frame of a viewed area when in the video mode and a differential signal containing information of interframe differences when in the differential mode, comprising:

means for sequentially activating sensors in different portions of the array for a period of time to achieve a desired detected frame interval;

a plurality of output circuits, each output circuit being connected to the respective sensors in a corresponding portion of the array, each output circuit being operable to store first and second voltage signals received from the connected sensors and to selectively provide a sensor output signal to the imaging system output; and a timing controller connected to the activating means and operable to cause each sensor row to be sequentially activated, and when in a differential mode, to cause the activated sensors to provide a voltage signal corresponding to a previous detected frame to the output circuits and then to provide a voltage signal corresponding to a present detected frame to the output circuits, and when in a video mode, to cause the activated sensors to provide a voltage signal corresponding to a reference voltage to the output circuits and then to provide a voltage signal corresponding to a present detected frame to the output circuits, and wherein the timing controller is further operable to cause the output circuits to sequentially provide the output signals to a common output line to generate either of the imaging system output signals.

8. A method of operating an imaging system, wherein the imaging system comprises an array of active pixel sensors, each sensor capable of collecting electrical charge based on a detected light intensity and having a diffusion well capable of holding an amount of electrical charge, each diffusion well being buffered from electrical signals generated external to the sensor, comprising the steps of:

(i) sequentially activating sensors in different portions of the array for a period of time to achieve a desired detected frame interval;

(ii) detecting a first voltage potential at a diffusion node of each activated sensor, wherein each of the first voltage potentials correspond to collected charges held by the respective diffusion wells for the image of the viewed area at a corresponding immediate previous frame;

(iii) resetting the voltage potential of the respective diffusion nodes of the activated sensors to a reference voltage potential;

(iv) transferring electrical charges collected for a present frame's detected light intensity from the image by each activated sensor to corresponding diffusion wells within the respective sensors, the voltage potentials at the activated sensors' diffusion nodes changing from the predetermined voltage potential to second voltage potentials corresponding to the respective amounts of transferred electrical charges;

(v) detecting the second voltage potentials at the diffusion nodes of the activated sensors; and (vi) generating the differential output signal based on sequentially determining the difference between the detected first and second voltage potentials of the activated sensors, wherein the sequential activation of the sensors in each portion of the array generates an output signal of sequential segments of the detected differences in the image of the viewed area at the corresponding pixel sensors between the previous and present frames.

9. The method of claim 8, wherein the step of generating the differential output signal further comprises the step of determining the difference between the detected first and second voltage potentials in the activated sensor row using respective differential output circuits connected to a respective active pixel sensor in each of the portions of the array.

10. The method of claim 8, further comprising the steps of:

storing the first voltage potential of said each activated sensor in a respective one of a first plurality of charge-storage devices; and storing the second voltage potential of said each activated sensor in a respective one of a second plurality of charge storage devices, wherein the step of generating the output signal includes applying the respective voltage potentials in each of the first and second pluralities of the charge storage devices to a plurality of subtractive signal combiners that sequentially generate the corresponding portions of the differential output signal.

11. The method of claim 8, wherein the step of operating the imaging system in the video mode comprises:

sequentially activating sensors in different portions of the array for a period of time to achieve a desired detected frame interval;

resetting the voltage potential of the respective diffusion nodes of the activated sensors to a reference voltage potential;

detecting a first voltage potential at a diffusion node of said each activated sensor, wherein each of the first voltage potentials correspond to the reference voltage potential;

transferring electrical charges collected for a present frame's detected light intensity from the image by said each activated sensor to corresponding diffusion wells within the respective sensors, the voltage potentials at the activated sensors' diffusion nodes changing from the reference voltage potential to second voltage potentials corresponding to the respective amounts of transferred electrical charges;

detecting the second voltage potentials at the diffusion nodes of the activated sensors; and generating the video output signal based on sequentially determining the difference between the detected first and second voltage potentials of the activated sensors, wherein the sequential activation of the sensors in each portion of the array generates an output signal of sequential segments of the image of the viewed area at the corresponding pixel sensors.

* * * * *